United States Patent [19]

Christensen

[11] Patent Number: 4,670,956

[45] Date of Patent: Jun. 9, 1987

[54] TOOL FOR HIGH VOLTAGE TRANSMISSION LINES

[75] Inventor: Sherwood D. Christensen, Billings, Mont.

[73] Assignee: Montana Power Company, Butte, Mont.

[21] Appl. No.: 835,422

[22] Filed: Mar. 3, 1986

Related U.S. Application Data

[63] Continuation of Ser. No. 628,433, Jul. 6, 1984, abandoned.

[51] Int. Cl.⁴ .............................................. B23P 19/04

[52] U.S. Cl. ...................................................... 29/247

[58] Field of Search .................... 81/488, 15.9; 29/247, 29/249

[56] References Cited

U.S. PATENT DOCUMENTS

| | | |
|---|---|---|
| 441,113 | 11/1890 | Sostmann . |
| 895,404 | 8/1908 | Jaegle . |
| 1,258,016 | 3/1918 | Kepner . |
| 1,355,174 | 10/1920 | Shepard . |
| 1,355,631 | 10/1920 | Wellbrook . |
| 1,518,068 | 12/1924 | Horn . |
| 1,682,009 | 8/1928 | Kinney . |
| 2,330,013 | 9/1943 | Schultz ............................. 29/247 X |
| 4,335,477 | 6/1982 | Halstead .......................... 81/3 R X |

OTHER PUBLICATIONS

A. B. Chance Company Catalog, Feb. 1980, pp. 7A-19 through 7A-24.

Kearney Catalog, May 1962, p. 8, Section 18.

*Primary Examiner*—Frederick R. Schmidt
*Assistant Examiner*—Debra S. Meislin
*Attorney, Agent, or Firm*—Christensen, O'Connor, Johnson & Kindness

[57] ABSTRACT

A tool is disclosed that is useful for manipulating the cotter keys that secure the connections between insulators in a high voltage transmission line. In a preferred embodiment, the tool (10) comprises an arm (12) having a first end (14) adapted for connection to a handle (40), and a second end (16) that includes an insert (30) projecting towards the first end. The insert is adapted for insertion into the passage in an insulator so as to engage the split end of a cotter key for partial removal of the cotter key. In a further embodiment, the second end of the tool includes a flange (32) having a concave surface (34, 36) adapted to engage the rounded end of a cotter key and push it back into an insulator.

3 Claims, 10 Drawing Figures

Fig. 1
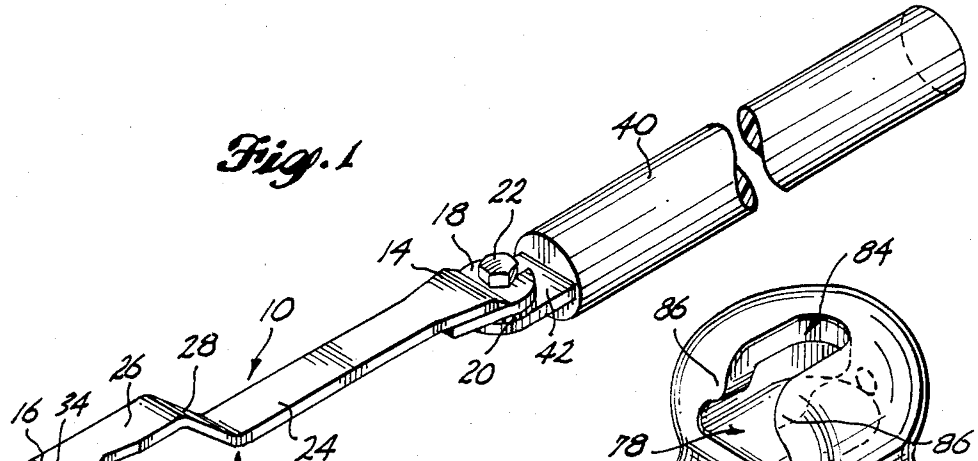
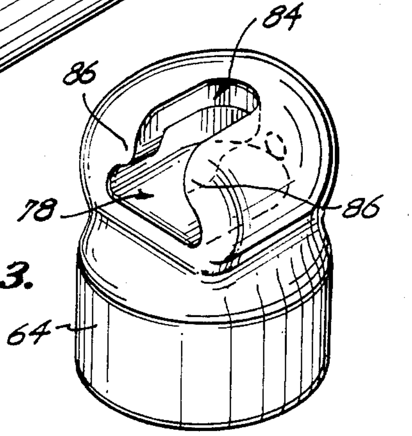
Fig. 3.
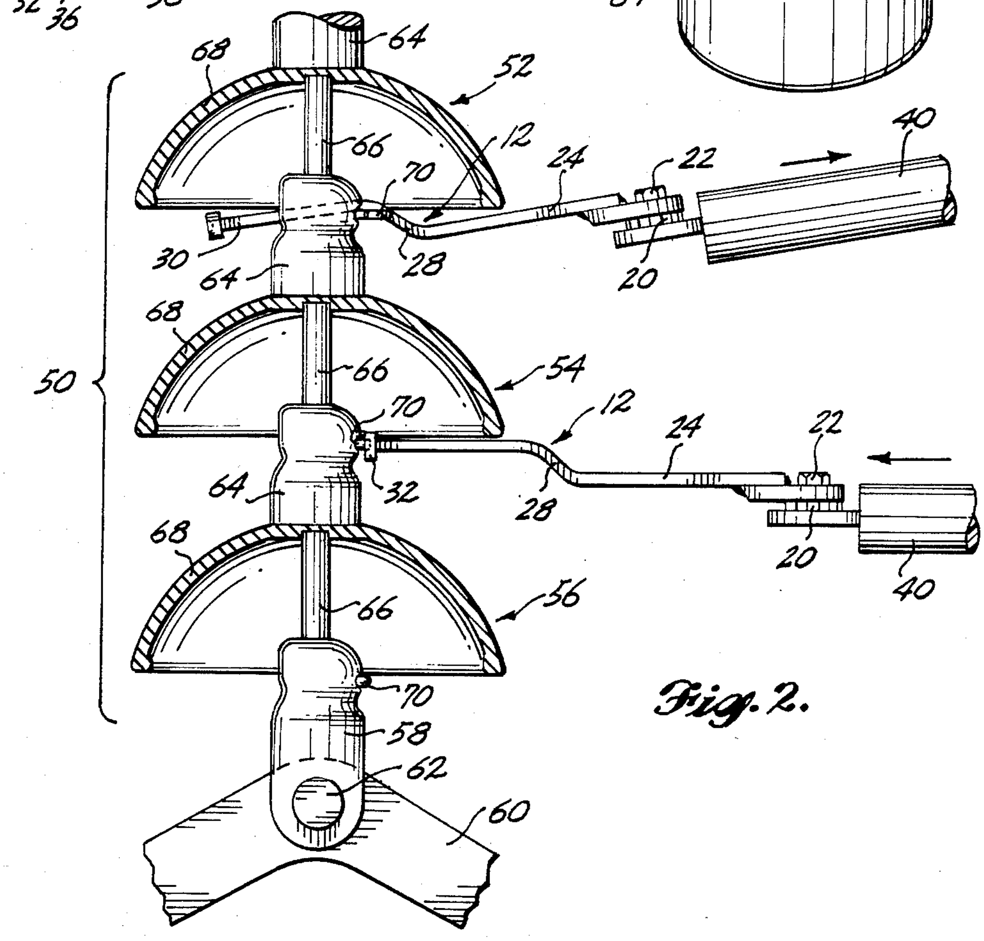
Fig. 2.

Fig. 4.
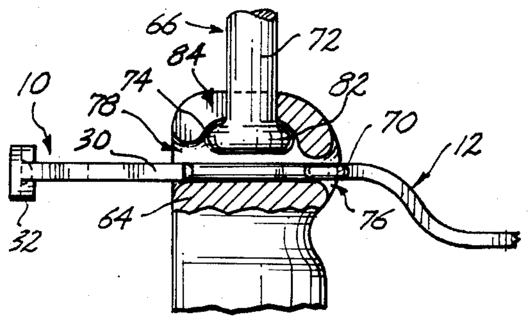
Fig. 5.
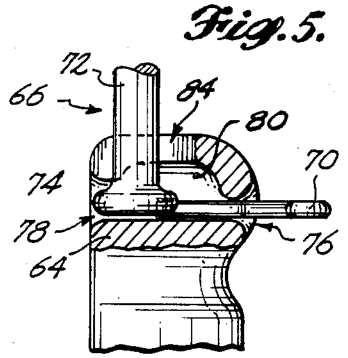
Fig. 6.
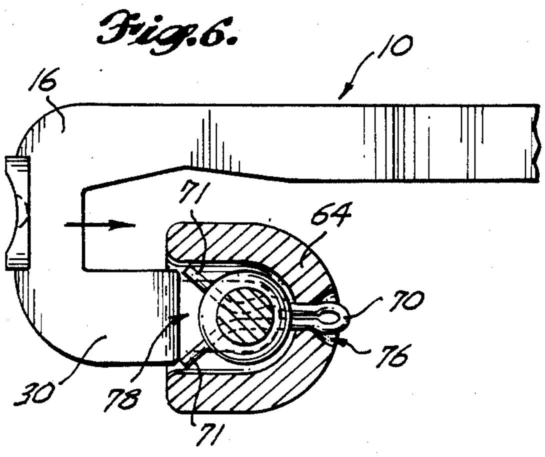
Fig. 7.
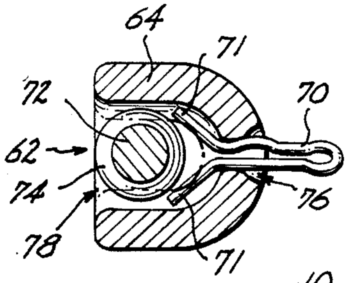
Fig. 8.
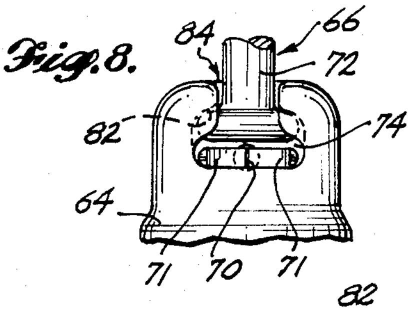
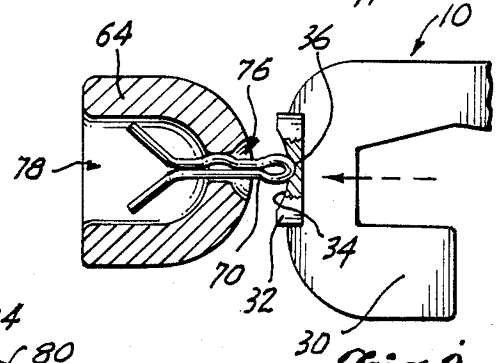
Fig. 9.
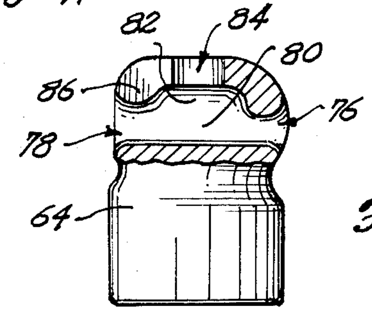
Fig. 10.

TOOL FOR HIGH VOLTAGE TRANSMISSION LINES

This application is a continuation application based on prior copending application Ser. No. 628,433, filed July 6, 1984, for Tool for High Voltage Transmission Lines, now abandoned.

BACKGROUND OF THE INVENTION

In one type of high voltage transmission system, the high voltage transmission lines are supported from metal towers by insulator assemblies that may be ten or more feet in length. Each insulator assembly comprises a string of insulators fastened together end to end, with each insulator including a pin, a cap, and an intervening hemispherical shell of insulating material such as glass. Pins and caps of adjacent insulators are connected together in a ball and socket fashion, and the connections are secured by cotter keys to produce the complete insulator assembly.

During maintenance of high voltage transmission systems, it frequently becomes necessary to remove or replace insulator assemblies while the high voltage line to which the assembly is connected is "hot." Removing or replacing an insulator assembly involves partially removing or inserting one or more of the cotter keys that secure the individual insulators to one another or to the transmission line or tower. Because the line is hot, the cotter keys must be manipulated by a tool held on the end of a long (e.g., 15 foot) insulating handle. One known tool consists of a small hook for engaging the rounded head of a cotter key, so that the cotter key can be hooked and partially removed by pulling on the insulating handle. However, engaging the head of a cotter key with a small hook at the end of a long handle can be a difficult process, particularly in a high wind. In addition, it is necessary to recess the heads of the cotter keys into the insulator caps to avoid undesirable high voltage corona discharges, a feature that greatly increases the difficulty of engaging the cotter key head with a hook. Using hook shaped tools, it is not uncommon for maintenance personnel to spend an hour or more removing a single cotter key from an insulator assembly.

SUMMARY OF THE INVENTION

The present invention provides a tool for manipulating cotter keys held in insulator assemblies that avoids the aforementioned difficulties. The tool of the present invention may be adapted to facilitate both the partial removal of cotter keys for disassembly of insulator assemblies, and the insertion of cotter keys for reassembly of the insulator assemblies.

In a preferred embodiment, the tool of the present invention is adapted for manipulating a cotter key held in a socket that includes interconnecting wide and narrow passages that together extend entirely through the socket. The narrow passage is sized such that the head or rounded end of the cotter key cannot pass through it, and the split end of the cotter key can pass through it only when the prongs making up such split end are adjacent to one another. The split end of the cotter key can therefore be inserted through the narrow passage into the wide passage, and the cotter key can then be secured in the socket by separating the prongs from one another. The tool comprises an arm having a first end adapted for connection to a handle, and a second end that includes an insert projecting towards the first end. The insert is adapted for insertion into the wide passage so as to engage the separated prongs of a cotter key secured therein. Pulling on the tool towards its first end will therefore force the cotter key partially out of the socket. In the case where the socket is the cap of an insulator, the pin of an adjacent insulator can then be removed from the socket, disassembling the insulator assembly.

In a further aspect of the invention, the second end of the tool includes a flange having a concave surface facing away from the first end. The concave surface is adapted for receiving the head or rounded end of the cotter key, such that the cotter key can be pushed into the opening by engaging the head of the cotter key with the flange and pushing the tool towards its second end.

These and other features and advantages of the present invention will be apparent in the detailed description and claims to follow, taken in conjunction with the accompanying drawings.

BRIEF DESCRIPTION OF THE DRAWINGS

FIG. 1 is a perspective view of a tool according to the present invention attached to an insulating handle;

FIG. 2 is a schematic cross-sectional view of a portion of an insulator assembly, showing the insertion and extraction of cotter keys by means of the tool of FIG. 1;

FIG. 3 is a perspective view of a cap of an insulator;

FIG. 4 is a vertical cross-sectional view of a connection between a pin and a cap, with the tool of the present invention in position to partially remove the cotter key;

FIG. 5 is a vertical cross-sectional view of the connection between a pin and a cap, showing the cotter key partially removed;

FIG. 6 is a horizontal cross-sectional view of a connection between a pin and a cap, with the tool of the present invention in position to partially remove the cotter key;

FIG. 7 is a horizontal cross-sectional view of the connection between a pin and a cap, showing the cotter key partially removed;

FIG. 8 is a cross-sectional view illustrating the securing of the connection between a pin and a cap by a cotter key;

FIG. 9 is a schematic view illustrating the insertion of a cotter key using the tool of FIG. 1; and FIG. 10 is a partial cross-sectional view of the cap of FIG. 3.

DETAILED DESCRIPTION OF THE INVENTION

Referring initially to FIG. 1, one preferred embodiment of tool 10 of the present invention comprises an arm 12 having one end 14 adapted for connection to insulating handle 40, and a second end 16 adapted for manipulating cotter keys held in insulator assemblies.

Handle 40 includes flange 42 extending from one end of the handle. Flange 42 includes an internally threaded opening adapted to receive bolt 22. End 14 of arm 12 includes mounting bracket 18, the mounting bracket comprising a generally circular plate having a U-shaped opening cut into one side. Mounting bracket 18 can therefore be positioned over the shaft of bolt 22, and bolt 22 can then be tightened to secure mounting bracket 18 and tool 10 to flange 42. Teeth 20 on the upper surface of flange 42 and on the lower surface of mounting bracket 18 prevent rotation of tool 10 with respect to handle 40 when bolt 22 is tightened. The angle between the longitudinal axes of arm 12 and handle 40 can be varied to suit particular applications.

Arm 12 includes longitudinal portions 24 and 26 separated by angled portion 28. The purpose of angled portion 28 is explained below. End 16 of arm 12 is generally hook-shaped, and includes insert 30 projecting towards end 14. End 16 also includes flange 32 that includes an indented central portion 34 within which concave dimple 36 is centrally positioned. Central portion 34 and dimple 36 both face away from end 14. As explained below, insert 30 is adapted for partially removing cotter keys from insulators, and flange 32 is adapted for pushing cotter keys into insulators. The radius of curvature of indented central portion 34 is greater than the radius of curvature of dimple 36.

FIG. 2 shows a typical insulator assembly 50 comprising insulators 52, 54 and 56. Insulator 56 is attached to socket 58 that is in turn attached by pin 62 to bracket 60. Bracket 60 is part of an assembly to which the high voltage transmission lines are mounted. The other end of insulator end 50 (not shown) is mounted to a transmission line tower that supports the insulator assembly.

Each insulator (52, 54 and 56) comprises a cap or socket 64, a pin 66 and a hemispherical insulator shell 68. The pins and caps of adjacent insulators are joined together and secured by cotter keys 70. FIG. 2 shows pin 66 of insulator 52 connected to cap 64 of insulator 54, and pin 66 of insulator 54 connected to cap 64 of insulator 56. Pin 66 of insulator 56 is connected in a similar fashion to socket 58. Cotter keys 70 are used to secure each of the aforementioned connections. A similar linkage may be used to connect the other end (not shown) of insulator assembly 50 to the transmission line tower.

FIGS. 3 and 10 illustrate cap 64 in greater detail. Cap 64 has a generally cylindrical shape, one end of the cap having the form of a hollow dome shaped so as to form a number of interconnecting passages including narrow passage 76, wide passage 78, central opening 80, upper chamber 82 and upper opening 84. Upper opening 84 is narrower than upper chamber 82, and horizontal access to the upper chamber is partially blocked by shoulders 86. The distance between shoulders 86 is appreciably less than the width of wide passage 78. As best illustrated in FIG. 6, narrow passage 76 is flared at its outer end to permit the head of cotter key 70 to be recessed in cap 64 to prevent corona discharge.

Referring now to FIGS. 4–7, pin 66 comprises shaft 72 and knob 74 at one end of the shaft. FIGS. 4 and 6 show a connection between pin 66 of one insulator and cap 64 of an adjacent insulator. Shaft 72 extends through upper opening 84, and knob 74 occupies upper chamber 82, knob 74 being too large to fit through the upper opening or between shoulders 86. This connection between the pin and caps is secured by cotter key 70. The cotter key extends through narrow passage 76 such that the prongs 71 that make up its split end are positioned in central opening 80 and in wide passage 78. As indicated in FIG. 6, the prongs are separated from one another. Narrow passage 76 is dimensioned such that prongs 71 can pass through the passage when the prongs are adjacent to one another, but such that neither the rounded head of the cotter key nor the separated prongs can pass through the passage. Cotter key 70 of FIG. 6 is thus secured in cap 64. As illustrated in FIGS. 4 and 8, when cotter key 70 is so positioned and secured, the cotter key prevents downward movement of pin 66 with respect to cap 64. Because knob 74 of pin 66 is too large to fit through upper opening 84 or between shoulders 86, pin 66 is secured in cap 64, and the pin cannot be removed from the cap for as long as cotter key 70 remains in the position illustrated in FIGS. 4 and 6.

FIGS. 4 and 6 illustrate the initial step in the disassembly of the adjacent insulators from one another. Tool 10 is positioned with respect to the insulators such that insert 30 extends part of the way into wide passage 78 of cap 64 and contacts prongs 71 of cotter key 70. Insert 30 is preferably dimensioned such that the width of the insert is slightly less than the width of wide passage 78 and central opening 80, and such that the height of the insert is approximately equal to the diameter of the cotter key. When tool 10 is positioned as indicated in FIGS. 4 and 6, the tool may be pulled to the right, such that insert 30 moves into central opening 80 and forces cotter key 70 to move rightward. Insert 30 is then withdrawn, leaving cotter key 70 partially removed from cap 64, in the position indicated in FIGS. 5 and 7. When cotter key 70 is in such a partially removed position, pin 66 may be moved downward such that knob 74 is adjacent wide passage 78, and the pin may then be removed from the cap, thereby disconnecting the insulators from one another.

To reconnect pin 66 to cap 64, the knob of pin 66 is reinserted through wide passage 78 and into upper chamber 82. As indicated in FIG. 9, tool 10 is then positioned such that flange 32 is adjacent the head of cotter key 70, and in particular such that the head of the cotter key is received within dimple 36. Tool 10 is then pushed towards cap 64, such that cotter key 70 is moved to the left into the position illustrated in FIGS. 4 and 6. Indented central portion 34 of flange 32 is provided to assist in guiding the dimple towards the head of the cotter key.

FIG. 2 further illustrates the use of the tool of the present invention. The upper part of FIG. 2 illustrates a stage in the disassembly of insulator 52 from insulator 54. Insert 30 of the tool has been inserted into cap 64 of insulator 54, and handle 40 has been pulled in the direction indicated by the arrow, to partially remove cotter key 70 from cap 64. The cotter key lies approximately in an "insulator plane" defined by the open end of hemispherical insulator shell 68 of adjacent insulator 52. Angled portion 28 of arm 12 permits the tool of the present invention to reach under the insulator shell to engage the cotter key. If the arm did not include angled portion 28, then the cotter key could not be partially removed from a direction above the insulator plane, because of interference between the arm and the lower edge of the insulator shell. The upper part of FIG. 2 illustrates the partial removal of the cotter key from a direction above the insulator plane of insulator 52. When a cotter key is partially removed from approximately the direction illustrated, sliding contact between arm 12 and the lower lip of shell 68 of insulator 52 may be used to assist placement of the tool. If the cotter key is to be partially removed from a lower direction, then handle 40 and tool 10 can first be rotated 180° about their common longitudinal axis to produce similar sliding contact when the tool is used from such a direction. In certain insulator assemblies, the cotter keys are positioned above the insulator planes, and in such cases angled portion 28 permits partial removal of the cotter keys from a horizontal direction.

The central part of FIG. 2 shows tool 10 of the present invention in the process of inserting cotter key 70 into cap 64 of insulator 56. As illustrated, the length of longitudinal portion 26 of the tool is such that when the tool is oriented horizontally with respect to the insulator assembly, longitudinal portion 26 abuts the lower lip of shell 68 of adjacent insulator 54, thus enabling the user to use the shell as a guide to position the tool.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the appended claims.

The embodiments of the invention in which an exclusive property or privilege is claimed are defined as follows:

1. A tool for manipulating a cotter key held in a socket, the cotter key comprising an elongated member having a rounded end and a split end, the split end comprising a pair of prongs that can be positioned either adjacent to or separated from one another, the socket comprising a body forming an element of an insulator assembly for a high voltage transmission line, the body being shaped so as to form an opening therethrough that includes interconnecting wide and narrow passages, the narrow passage being sized such that the rounded end of the cotter key cannot pass through it, and the split end of the cotter key can pass through it only when the prongs are substantially adjacent to one another, whereby the split end of the cotter key can be inserted through the narrow passage into the wide passage and the cotter key can then be secured in the socket by separating the prongs from one another, the tool comprising an arm having a first end adapted for connection to a handle such that the arm extends from and is parallel to the handle and a second end opposite the first end, the tool further comprising an intermediate member having a first end connected to the second end of the arm and a second end, the intermediate member extending in a direction perpendicular to the arm, and an insert connected to the second end of the intermediate member and projecting towards the first end of the arm in a direction parallel to the arm, the insert having a shape and size that permit the insert to be inserted into the wide passage so as to engage the separated prongs of a cotter key secured therein, the tool further comprising a flange, mounted on the intermediate member, having a concave surface facing away from the first end of the arm, the concave surface being adapted for receiving the rounded end of the cotter key, whereby inserting the insert in the wide passage and pulling the tool towards the first end of the arm will cause the insert to contact the cotter key and to push the cotter key towards the first end of the arm thereby forcing the split ends of the cotter key through the narrow passage and forcing the cotter key partially out of the socket, and whereby the cotter key can be pushed into the opening by engaging the rounded end of the cotter key with the flange and pushing the tool towards the second end of the arm.

2. The tool of claim 1, wherein the split ends of the cotter key have a substantially circular cross section having a predetermined diameter when the prongs are substantially adjacent to one another, and wherein the insert has a rectangular cross section having a height corresponding to the diameter of the cotter key.

3. The tool of claim 1, wherein the socket comprises an insulator that includes a pin adapted to be positioned in the wide passage of a similar first adjacent insulator, a cap including the wide and narrow passages and adapted to receive the pin of a similar second adjacent insulator, and a hemispherical shell having an open end and positioned such that when the pin is positioned in the wide passage of the first adjacent insulator and a second cotter key is secured in the socket of the first adjacent insulator, the second cotter key lies approximately in the plane defined by the open end of the shell, and wherein the second end of the arm is offset with respect to the first end of the arm in a direction transverse to the longitudinal axis of the arm, such that when the tool is approximately parallel to or above said plane, the second end can engage the separated prongs of the second cotter key without interference between the tool and the shell.

* * * * *